(12) United States Patent
Aono (10) Patent No.: US 7,827,194 B2
(45) Date of Patent: Nov. 2, 2010

(54) ACCESS TO SHARED DISK DEVICE ON STORAGE AREA NETWORK

(75) Inventor: Hiroshi Aono, Tokyo (JP)

(73) Assignee: NEC Corporation, Tokyo (JP)

( * ) Notice: Subject to any disclaimer, the term of this patent is extended or adjusted under 35 U.S.C. 154(b) by 239 days.

(21) Appl. No.: 10/875,810

(22) Filed: Jun. 25, 2004

(65) Prior Publication Data

US 2004/0267754 A1 Dec. 30, 2004

(30) Foreign Application Priority Data

Jun. 27, 2003 (JP) .............................. 2003-185668

(51) Int. Cl.
*G06F 7/00* (2006.01)
*G06F 17/30* (2006.01)
(52) U.S. Cl. .................................................. 707/782
(58) Field of Classification Search ................. 707/781, 707/782
See application file for complete search history.

(56) References Cited

U.S. PATENT DOCUMENTS

| | | | | |
|---|---|---|---|---|
| 5,491,808 | A | * | 2/1996 | Geist, Jr. ..................... 711/100 |
| 5,657,447 | A | * | 8/1997 | Leung et al. ................... 707/1 |
| 5,923,846 | A | * | 7/1999 | Gage et al. ................... 709/213 |
| 5,991,771 | A | * | 11/1999 | Falls et al. ................... 707/202 |
| 6,041,318 | A | * | 3/2000 | Danford-Klein et al. .... 705/400 |
| 6,088,693 | A | * | 7/2000 | Van Huben et al. ............. 707/8 |
| 6,226,642 | B1 | * | 5/2001 | Beranek et al. ................ 707/10 |
| 2001/0037371 | A1 | * | 11/2001 | Ohran ......................... 709/214 |
| 2002/0032708 | A1 | * | 3/2002 | Gupta et al. ................. 707/539 |
| 2002/0042833 | A1 | * | 4/2002 | Hendler et al. ............... 709/231 |
| 2002/0078066 | A1 | * | 6/2002 | Robinson et al. ......... 707/104.1 |
| 2002/0083120 | A1 | * | 6/2002 | Soltis ......................... 709/200 |
| 2003/0101186 | A1 | * | 5/2003 | Lanzatella et al. ............ 707/10 |

FOREIGN PATENT DOCUMENTS

| | | |
|---|---|---|
| JP | 11-120063 | 4/1999 |
| JP | 2000-267866 | 9/2000 |

OTHER PUBLICATIONS

Atsuhisa Otani et al.: Supercomputer SX-6 Special Edition. GFS advanced shared filesystem in the SX-6. NEC Technical Journal, Japan, NEC Corporation, Sep. 25, 2002, vol. 55, No. 9, pp. 46 to 49.

* cited by examiner

*Primary Examiner*—Luke S. Wassum
*Assistant Examiner*—Mariela D Reyes
(74) *Attorney, Agent, or Firm*—Foley & Lardner LLP (57) ABSTRACT

An access system for accessing a storage area network (SAN) has a shared disk device provided on the SAN, and a client for accessing a file in a file system created in the shared disk device. In the client, a functionality of accessing a file system in the shared disk device is installed as part of a user program of the client by using a dynamic link library. The client preferably has access processing means for inserting, as the functionality of accessing, access processing for accessing the file system in the shared disk device into ordinary file access processing. The access processing means being installed as a dynamic link library.

24 Claims, 7 Drawing Sheets

ACCESS TO SHARED DISK DEVICE ON STORAGE AREA NETWORK

BACKGROUND OF THE INVENTION

1. Field of the Invention

The present invention relates to a storage area network (SAN), and more particularly, to an access system in which each of a plurality of computer systems can make fast data accesses to a single file system created in one or more shared disk devices on the SAN.

2. Description of the Related Art

In recent years, storage area networks (SANS) have been implemented for providing fast networks which connect external storage devices with one another, and between storage devices and computers. The SAN is particularly effective when a plurality of servers are associated to provide a certain functionality, and when a single shared disk device having a large capacity is shared by a plurality of servers. The introduction of SAN having such a topology can result in improved processing performance of servers, and a reduced load on a network between computers, such as LAN (Local Area Network), WAN (Wide Area Network), and the like for intermediating communications between servers and clients.

Conventionally, in a system which comprises a client, a server, a SAN, and a shared disk device provided on the SAN, a functionality of the client device for accessing the shared disk device, i.e., a client functionality is installed in a kernel of an operating system (OS) in the client device.

Japanese patent laid-open application No. 11-120063 (JP-11-120063-A), for example, discloses a system in which a disk device is shared among a plurality of computers through a network. This system is intended to reduce a load on a server which is responsible for file management, and to avoid transferring file data through a network to provide faster processing. In this system, the server is responsive to a request from a client on the network to send management information on a requested file to the requesting client, such that the requesting client directly accesses the shared disk through the SAN based on the management information sent thereto.

However, the conventional accessing method to the shared disk on the SAN as described above implies the following problems.

First, since a SAN accessing functionality is installed in the kernel of each client, this functionality depends on the version of the kernel. Therefore, a functionality for accessing the storage area network must be re-installed for each version of the kernel.

Second, since a variety of methods exist for implementing accesses to the SAN depending on the platforms or operating systems, the kernel in the client must be adapted by re-compiling, relinking, and the like for installing the functionality of a client in a different platform. Consequently, the porting of the client functionality entails significant efforts and cost.

Third, when the SAN access functionality is included in kernel facilities, bugs included in the access functionality, if any, could affect the overall system of the SAN.

SUMMARY OF THE INVENTION

It is a first object of the present invention to provide a system for accessing a shared disk device on a SAN, which is capable of separating processing for making a fast access to a shared file system in the SAN from processing of a kernel.

It is a second object of the present invention to provide a client for accessing a shared disk device on a SAN, which is capable of separating processing for making a fast access to a shared file system in the SAN from processing of a kernel.

It is another object of the present invention to provide an access system which is capable of installing a client's functionality of accessing a SAN without adaptation of a kernel, and facilitating the porting of the functionality into different platforms.

It is a further object of the present invention to provide a client which is capable of installing a SAN access functionality without adaptation of a kernel, and facilitating the porting of the functionality into different platforms.

The first object of the present invention is achieved by an access system which comprises a shared disk device provided on a storage area network; and a client for accessing a file in a file system created in the shared disk device, wherein a functionality of accessing the file system in the shared disk device is installed within the client as part of a user program of said client by utilizing a dynamic link library.

The second object of the present invention is achieved by a client for accessing a file in a file system created in a shared disk device on a storage area network. The client comprises means for executing a user program for accessing said file; and means for installing a functionality of accessing to the file system as part of the user program by utilizing a dynamic link library.

In the present invention, the processing for making a fast access to a shared file system in the storage area network can be separated in the client from the processing of the kernel. Therefore, the functionality of accessing the storage area network can be installed into the client without altering the kernel, thereby reducing the number of steps required for porting the functionality into a different platform. The present invention also eliminates an inconvenience of repeatedly installing a client functionality for each version of kernel in order to access the storage area network. Since the functionality of accessing the storage area network is not installed in the kernel, bugs, if any, would be prevented from affecting the overall system of the storage area network.

The above and other objects, features, and advantages of the present invention will become apparent from the following description with reference to the accompanying drawings which illustrate examples of the present invention.

DETAILED DESCRIPTION OF THE PREFERRED EMBODIMENTS

Figure 1:
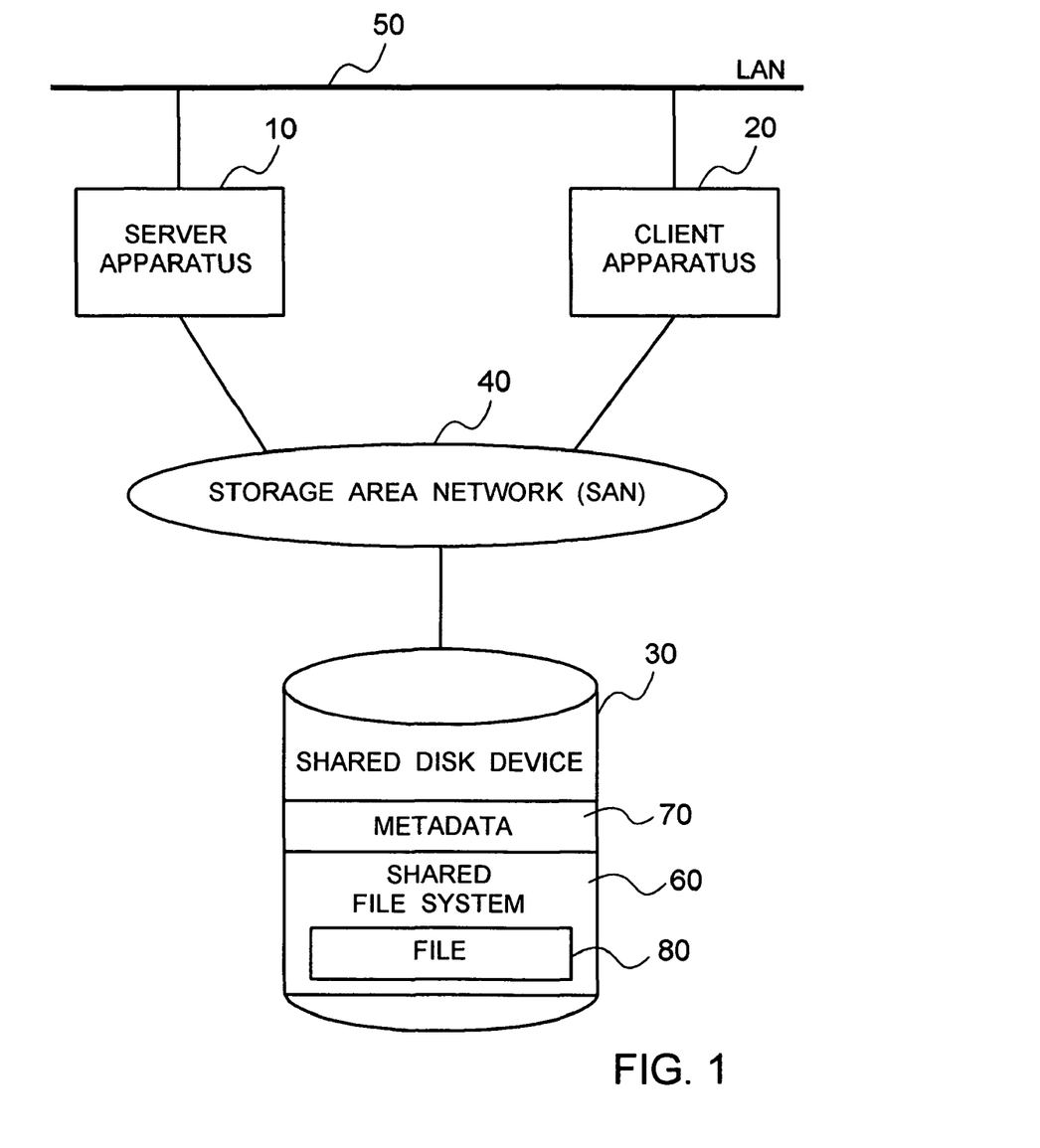
FIG. 1 is a block diagram illustrating the general configuration of an access system according to a preferred embodiment of the present invention for providing accesses to a shard disk device on a storage area network (SAN)

An access system according to a preferred embodiment of the present invention illustrated in FIG. 1 provides accesses to a shared disk device on a storage area network (SAN). This access system comprises server apparatus 10; client apparatus 20; shared disk device 30; SAN 40; and LAN (Local Area Network) 50.

Server apparatus 10 and client apparatus 20 are interconnected through LAN 50 in a network manner. Also, server apparatus 10, client apparatus 20, and shared disk device 30 are all connected to SAN 40.

Shared disk device 30 includes shared file system 60 local to server apparatus 10. Server apparatus 10 manages shared file system 60 created in shared disk device 30. Shared file system 60 stores metadata 70 and file 80. An access to file 80 requires the use of metadata 70 which is managed by server apparatus 10. Shared disk device 30 is accessed in accordance with a SCSI (Small Computer System interface) protocol, using a physical address and a data size (I/O (Input/Output) size) as parameters, from server apparatus 10 and client apparatus 20 through SAN 40.

On the other hand, client apparatus 20 mounts shared file system 60 via the network using a functionality of a network file system (NFS). Client apparatus 20 can know the existence of file 80 using the NFS.

When client apparatus 20 accesses shared file system 60, client apparatus 20 transmits, to server apparatus 10, a file handle which is information for identifying file 80 to be accessed, an offset value from the head for file 80 and an I/O size, through LAN 50. The file handle is, for example, a file identifier with which server apparatus 10 manages a file of interest.

Server apparatus 10 transmits, to client apparatus 20, a physical disk address, i.e., start address of shared disk device 30 corresponding to the offset value from the head for file 80, the I/O size, and an offset address from the head of file 80 through LAN 50.

Subsequently, client apparatus 20 directly accesses shared disk device 30 through SAN 40 in accordance with the foregoing information transmitted from server apparatus 10 to realize a fast access to a file within shared file system 60 from client apparatus 20.

In this embodiment, the foregoing functionality of accessing shared file 60, performed by client apparatus 20, can be realized only by an application interface (API) of the OS. This eliminates the need for modifying the kernel of client apparatus 20 for realizing the functionality, and facilitates porting of the functionality into a variety of platforms.

Figure 2:
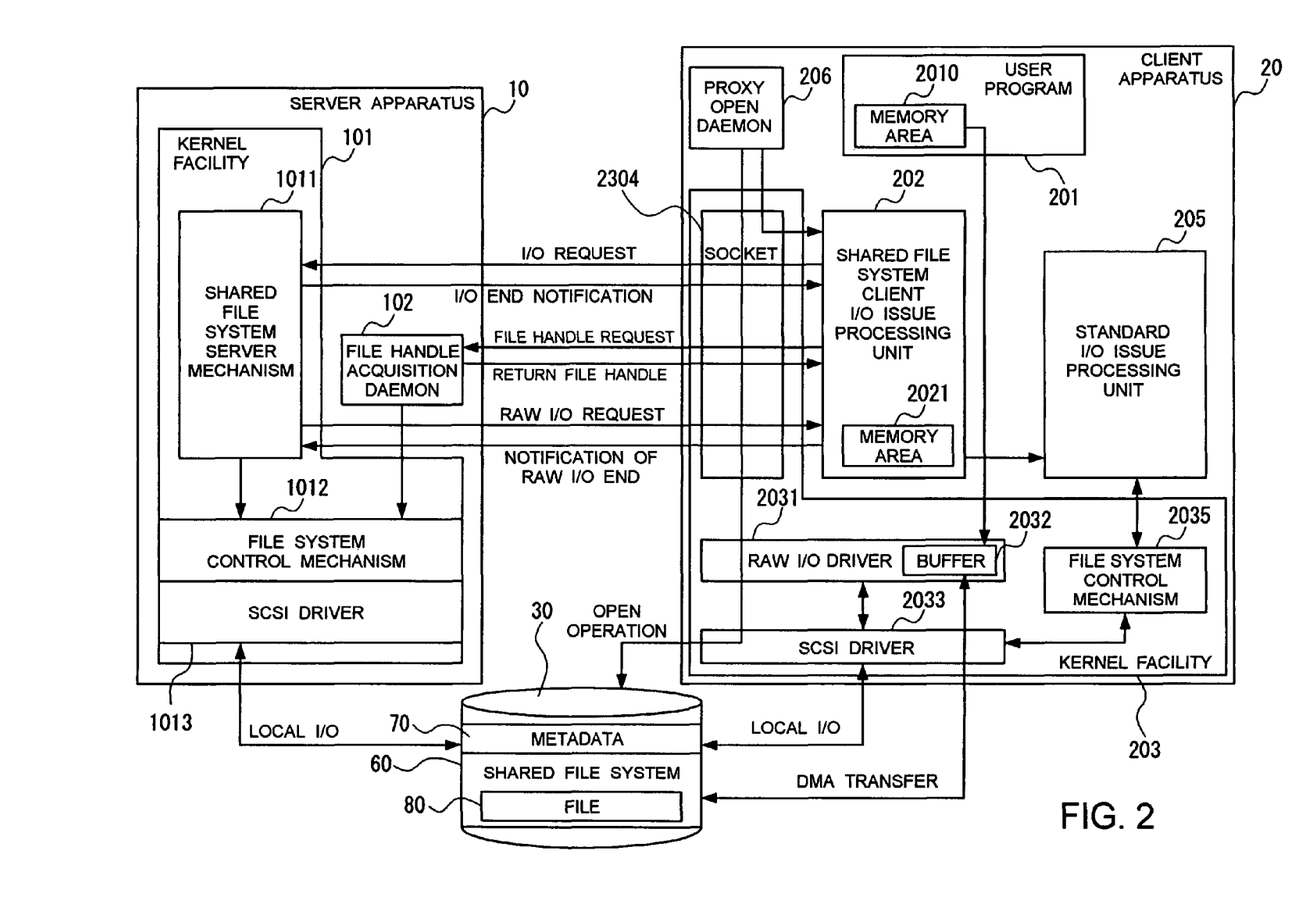
FIG. 2 is a block diagram illustrating the internal configuration of a server apparatus and a client apparatus in the access system illustrated in FIG. 1.

FIG. 2 illustrates the internal configuration of server apparatus 10 and client apparatus 20 in detail.

Server apparatus 10 has installed therein kernel facility 101 which includes shared file system server mechanism 1011, file system control mechanism 1012, and SCSI driver 1013. SCSI driver 1013 serves as an interface to SAN 40 (refer to FIG. 1). Also, in server apparatus 10, file handle acquisition daemon 102 acts as a process which operates in a user space. Here, the daemon refers to a process for implementing a functionality of the system, or executing some background service in accordance with a general usage in this technical field.

Client apparatus 20 has installed therein kernel facility 203 which includes Raw I/O driver 2031, SCSI driver 2033, socket mechanism 2034, and file system control mechanism 2035. SCSI driver 2033 serves as an interface to SAN 40 (refer to FIG. 1). Raw I/O driver 2031 includes buffer 2032 which is a memory area for transferring data to a user space. There is user program 201 which is an I/O issuing process on client apparatus 20, where user program 201 operates with memory area 2010 allocated thereto for I/O operations.

Further, shared file system client I/O issue processing unit 202 and standard I/O issue processing unit 205 exist on client apparatus 20, and are provided as dynamic link libraries, respectively. In addition, proxy open daemon 206 operates on client apparatus 20.

Kernel facility 101 and file handle acquisition daemon 102 of server apparatus 10 are executed on a program controllable computer processing unit, i.e., CPU of server apparatus 10 associated therewith to implement their respective facilities. Similarly, kernel facility 203, user program 201, shared file system client I/O issue processing unit 202, standard I/O issue processing unit 205, and proxy open daemon 206 of client apparatus 20 are executed on a program controllable computer processing unit (i.e., CPU) of client apparatus 20 associated therewith to implement their respective functionalities.

In shared file system I/O issue processing unit 202 and standard I/O issue processing unit 205, which are dynamic link libraries, "open", "read", "write", and "close" functions are defined in the same symbol names. As user program 201 calls the open, read, write, or close function, kernel facility 203 executes a function included in the dynamic link library as part of user program 201 for solving a symbol name.

Proxy open daemon 206, which operates in the user space, is operating on client apparatus 20. This daemon can communicate with user program 201 by utilizing socket mechanism 2034 included in kernel facility 203.

Next, description will be made on the processing involved in an access made by user program 201 on client apparatus 20 to file 80 in shared disk device 30.

When an access is made to file 80 from user program 201 on client apparatus 20, a file handle for file 80 on shared file system 60 must be transmitted to shared file system server mechanism 1011 in server apparatus 10. However, since shared file system 60 is a local file system on server apparatus 10, client apparatus 20 cannot acquire the file handle for file 80 with API provided by a general OS. To address this inconvenience, in this embodiment, file handle acquisition daemon 102 is located on server apparatus 10. File handle acquisition daemon 102, which operates in a privileged mode on server apparatus 10, can acquire, from file system control mechanism 1012, a file handle for a file which is created on shared file system 60 and has an arbitrary file name.

Shared file system client I/O issue processing unit 202 of client apparatus 20 transmits an absolute pass name of the file to file handle acquisition daemon 102, and acquires the file handle for file 80 on server apparatus 10 as a return to the transmitted absolute pass name.

Next, description will be made on a scheme according to the present invention for accessing shared disk device 30 without altering user program 201.

When user program 201 operates for accessing shared disk device 30, user program 201 is dynamically linked to shared file system client I/O issue processing unit 202 in client apparatus 20, and acts as one user program. Shared file system client I/O issue processing unit 202 has installed therein open, read, write, and close functions which are I/O processing APIs of the kernel facility. These functions are implemented using Raw I/O driver 2031 installed in kernel facility 203 and API of socket mechanism 2034 installed in kernel facility 203. Raw I/O driver 2031 provides API for using I/O processing in accordance with the SCSI protocol from user program 201. This API is an API of a low level access processing functionality to shared disk device 30.

For accessing a general file system, user program 201 is dynamically linked to standard I/O issue processing unit 205 which has been previously provided on the system of client apparatus 20, and inputs and outputs data using the APIs of the open, read, write, and close functions. In this embodiment, a search pass of the dynamic link library is modified such that shared file system client I/O issue processing unit 202 is dynamically linked to user program 201 in advance. As a result, a library of shared file system client I/O issue processing unit 202 is first linked to user program 201, as a link of the dynamic link library, and a library of standard I/O issue processing unit 205 is next linked to user program 201.

By thus linking the dynamic link libraries, functions included in shared file system client I/O issue processing unit 202 are executed first in open, read, write, and close operations for a file, thus making it possible to insert client processing for accessing the shared file system into these functions.

Next, description will be made on a Raw I/O accessing method.

Generally, Raw I/O driver 2031 must be accessed in the privileged mode. However, user program 201 often operates in a non-privileged mode, in which case user program 201 cannot access Raw I/O driver 2031. However, as a functionality of Raw I/O driver 2031, access rights for shared disk device 30 may be managed such that the open operation to shared disk device 30 is performed in the privileged mode, and the respective read, write, and close operations, which are actual manipulations on shared disk device 30 subsequent to the open operation, are performed using a file handle of shared disk device 30 which is acquired in the course of the open operation. Specifically, if user program 201 holds a copy of the file handle of shared disk device 30, Raw I/O drive 2031 can be accessed even in the non-privileged mode. For this reason, proxy open daemon 206, which operates in the privileged mode, is located on client apparatus 20 in this embodiment.

Proxy open daemon 206 can operate in the privileged mode to access Raw I/O driver 2031, and communicates with shared file system client I/O issue processing unit 202 through socket mechanism 2034. Shared file system client I/O issue processing unit 202 forces proxy open daemon 206 to execute an open operation otherwise executed by the Raw I/O driver of shared disk device 30, and acquires a copy of the file handle using API of socket mechanism 2034. In this way, shared file system client I/O issue processing unit 202 can execute subsequent read and write operations to shared disk device 30 through Raw I/O driver 2031 in the non-privileged mode by use of the copy of the file handle acquired by proxy open daemon 206.

With the employment of the strategy as described above, according to this embodiment, a means for accessing shared file system 60 on server apparatus 10 can be separated from the kernel facility in client apparatus 20. Additionally, in client apparatus 20, file 80 on shared file system 60 can be accessed only by user program 201.

In the following, detailed description will be made on the general operation of the system according to this embodiment.

When user program 201 on client apparatus 20 accesses file 80 on shared file system 60, user program 201 first reserves memory area 2010 for storing data in accordance with an ordinary processing procedure. User program 201 can write data into memory area 2010, or read data written therein. Next, the open, read, write, and close operations will be described one by one.

Figure 3:
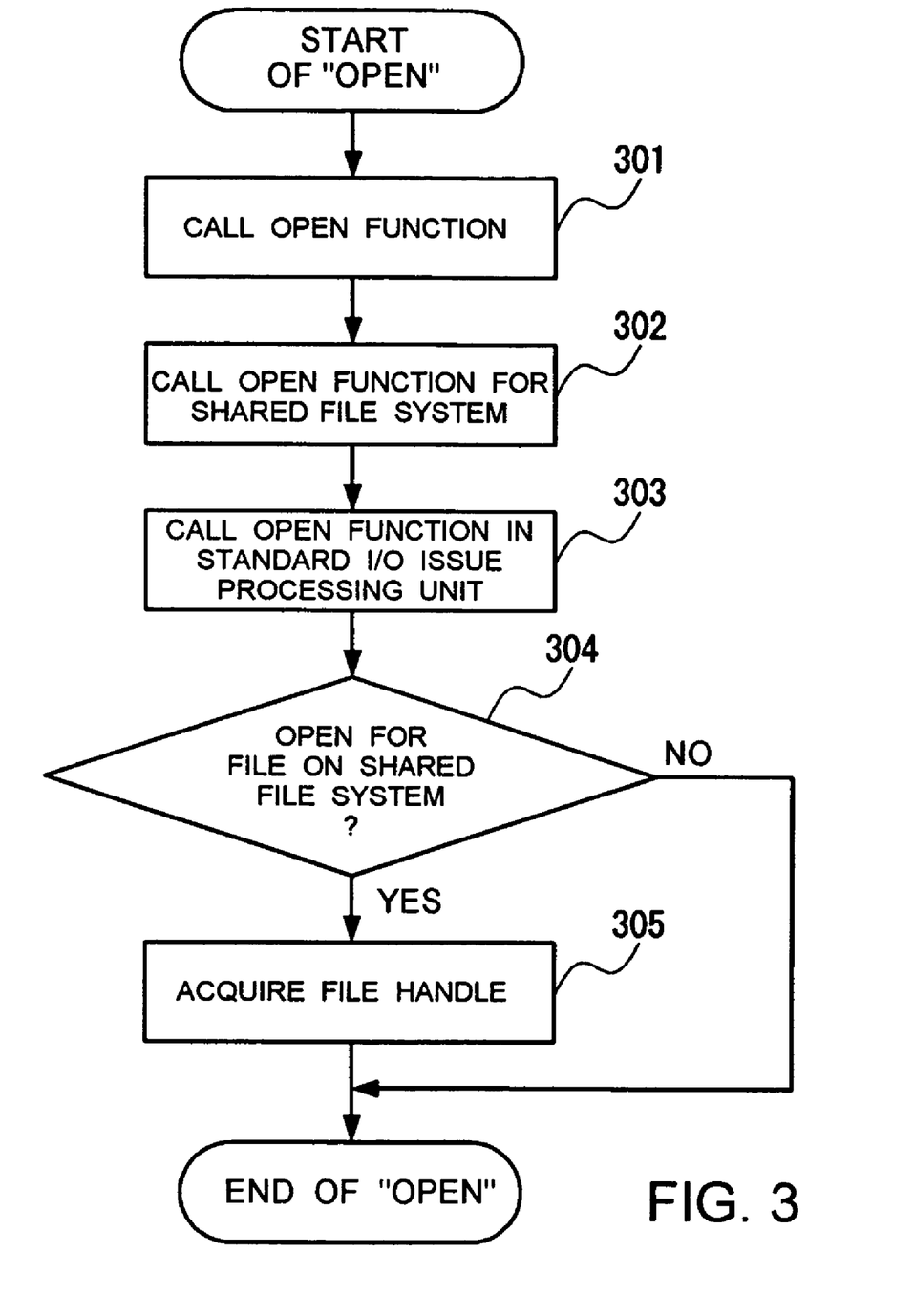
FIG. 3 is a flow chart for describing a sequence of operations performed when a user program opens a file on the shared disk device in the access system illustrated in FIG. 1.

In a processing for opening a file, i.e., in a processing which involves the execution of the open function, when user program 201 is to access file 80 on shared disk device 30, user program 201 first calls the open function for opening file 80 at step 301, as illustrated in FIG. 3. In this event, kernel facility 203 of client apparatus 20 attempts to dynamically link the open function from the system. In this situation, when a dynamic link search pass has been set to first search shared file system client I/O issue processing unit 202, shared file system client I/O issue processing unit 202 is first dynamically linked for the open function, and at step 302, a call is made to the open function included in shared file system client I/O issue processing unit 202. Then, at step 303, a call is made to the open function included in standard I/O issue processing unit 205.

Next, at step 304, it is checked whether or not file 80 is resident on shared file system 60. If file 80 is not resident on shared file system 60, subsequent processing is performed by the open function of standard I/O issue processing unit 205 to terminate this file opening processing. On the other hand, if file 80 is resident on shared file system 60 as determined at step 304, user program 201 communicates with file handle acquisition daemon 102 of server apparatus 10 using socket mechanism 2034 to acquire a file handle for file 80 managed by server apparatus 10 at step 305. Afterward, when user program 201 communicates with shared file system server mechanism 1011, the file handle acquired here is used to identify a file.

Figure 4:
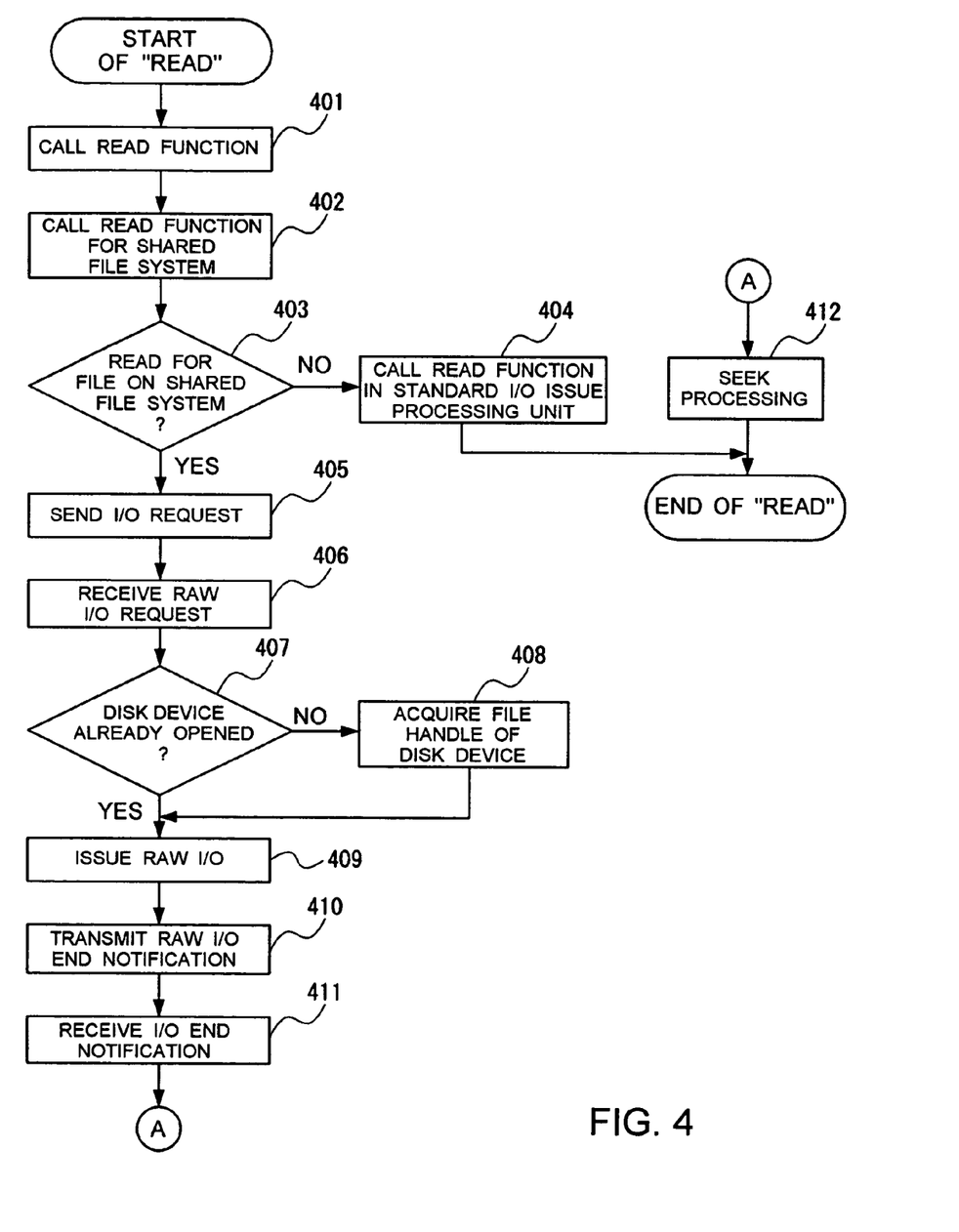
FIG. 4 is a flow chart for describing a sequence of operations performed when a user program reads a file on the shared disk device in the access system illustrated in FIG. 1.

Referring next to FIG. 4, description will be made on a sequence of operations performed when user program 201 reads file 80, i.e., executes a read function.

First, at step 401, user program 201 calls the read function. In this event, the read function called at step 402 is a read function included in shared file system client I/O issue processing unit 202 in accordance with the order of a dynamic link search pass.

Next, at step 403, it is checked whether or not file 80 is resident on shared file system 60. If the file 80 is not resident on shared file system 60, user program 201 calls a read function included in standard I/O issue processing unit 205 at step 404, followed by termination of this read operation.

On the other hand, if file 80 is resident on shared file system 60 as determined at step 403, user program 201 transmits an I/O request including the file handle acquired at step 305 to shared file system server mechanism 1011 in server apparatus 10 through socket mechanism 2034 at step 405. In response to this I/O request, shared file system server mechanism 1011 transmits a physical address, an I/O size, and an offset value of file 80 to client apparatus 20 as a row I/O request at step 406, and shared file system client I/O issue processing unit 202 of client apparatus 20 receives the raw I/O request. In this event, the raw I/O request includes the device file name of shared disk device 30.

Next, at step 407, it is checked whether or not shared disk device 30 included in the raw I/O request has been previously opened. If shared disk device 30 has not been opened, user program 201 requests proxy open daemon 206 to open shared disk device 30 at step 408 in a manner similar to the foregoing file opening processing. Proxy open daemon 206 opens shared disk device 30 in the privileged mode, and transmits a file handle to shared disk device 30 through socket mechanism 2034. Generally, the transmission of a file handle entails the use of extended message SCM_RIGHTS included in socket mechanism 2034. As a result, at step 408, shared file system client I/O issue processing unit 202 acquires the file handle to shared disk device 30. Afterward, shared disk device 30 can be accessed using the file handle acquired at step 408. After step 408, the control proceeds to step 409.

If shared disk device 30 has been previously opened as determined at step 407, the control proceeds to step 409, bypassing step 408, because the file handle to shared disk device 30 has already been acquired.

At step 409, user program 201 accesses shared disk device 30 with Raw I/O driver 2031 by utilizing the raw I/O request acquired at step 406 and the file handle to shared disk device 30. In this event, user program 201 can pass through a check for an access right of Raw I/O driver 2031, because user program 201 uses the file handle which has been acquired when shared disk device 30 was opened by proxy open daemon 206.

Raw I/O driver 2031 accesses shared disk device 30 through SCSI driver 2033, and read data is transferred to buffer 2032 by DMA (Direct Memory Access), and then copied into memory area 2010 reserved for user program 201 by Raw I/O driver 2031. Subsequently, shared file system client I/O issue processing unit 202 transmits a notification of the Raw I/O end to shared file system server mechanism 1011 at step 410, and receives the notification of the I/O end from shared file system server mechanism 1011 at step 411. Then, at step 412, user program 201 seeks the same size as that issued in the read operation to match the file position, followed by termination of the read operation.

Figure 5:
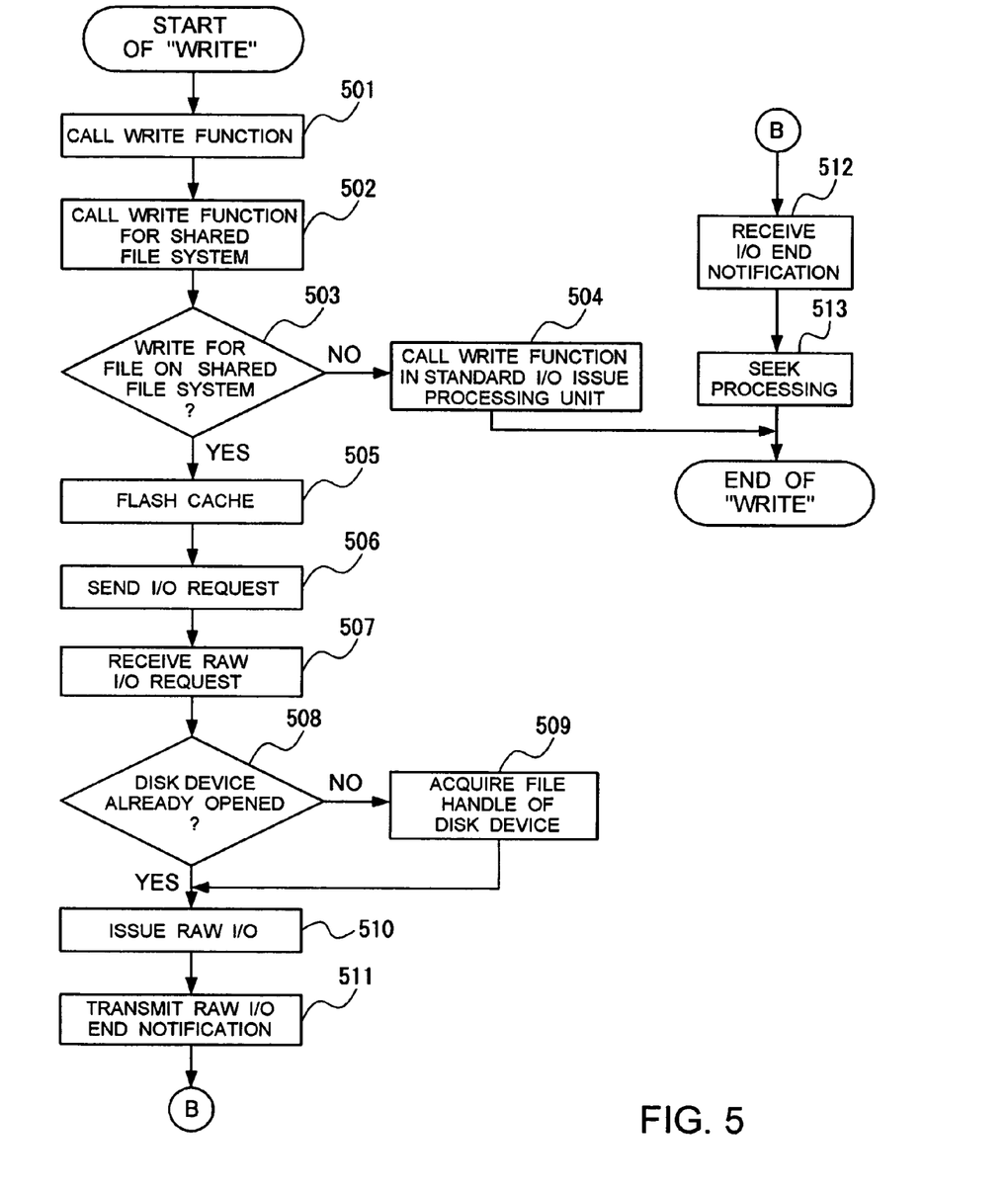
FIG. 5 is a flow chart for describing a sequence of operations performed when a user program writes a file on the shared disk device in the access system illustrated in FIG. 1.

Referring next to FIG. 5, description will be made on a sequence of operations performed when user program 201 writes into file 80, i.e., executes a write function.

First, user program 201 calls the write function at step 501. In this event, the write function called at step 502 is a write function included in shared file system client I/O issue processing unit 202 in accordance with the order of a dynamic link search pass.

Next, at step 503, it is checked whether or not file 80 is resident on shared file system 60. If file 80 is not resident on shared file system 60, user program 201 calls a write function included in standard I/O issue processing unit 205 at step 504, followed by termination of this write operation.

On the other hand, if file 80 is resident on shared file system 60 as determined at step 503, user program 201 first flashes a cache of file 80 at step 505, and transmits an I/O request including the file handle acquired at step 305 to shared file system server mechanism 1011 in server apparatus 10 through socket mechanism 2034 at step 506. In response to this I/O request, shared file system server mechanism 1011 transmits a physical address, an I/O size, and an offset value of file 80 to client apparatus 20 as a row I/O request at step 507, and shared file system client I/O issue processing unit 202 of client apparatus 20 receives the raw I/O request. In this event, the raw I/O request includes the device file name of shared disk device 30.

Next, it is checked at step 508 whether or not shared disk device 30 included in the raw I/O request has been previously opened. If shared disk device 30 has not been opened, user program 201 requests proxy open daemon 206 to open shared disk device 30 at step 509 in a manner similar to the foregoing file opening processing. Proxy open daemon 206 opens shared disk device 30 in the privileged mode, and transmits a file handle to shared disk device 30 through socket mechanism 2034. Generally, the transmission of a file handle entails the use of extended message SCM_RIGHTS included in socket mechanism 2034. As a result, at step 509, shared file system client I/O issue processing unit 202 acquires the file handle to shared disk device 30. Afterward, shared disk device 30 can be accessed using the file handle acquired at step 509. After step 509, the control proceeds to step 510.

If shared disk device 30 has been previously opened as determined at step 508, the control proceeds to step 510, bypassing step 509, because the file handle to shared disk device 30 has already been acquired.

At step 510, user program 201 accesses shared disk device 30 with Raw I/O driver 2031 by utilizing the raw I/O request acquired at step 507 and the file handle to shared disk device 30. Similar to the aforementioned case, user program 201 can pass through a check for an access right of Raw I/O driver 2031, because user program 201 uses the file handle which has been opened by proxy open daemon 206.

Raw I/O driver 2031 accesses shared disk device 20 through SCSI driver 2033. Write data is transferred from memory 2010 reserved for user program 201 to buffer 2032, and again transferred to shared disk device 30 by Raw I/O driver 2031 through SCSI driver 2033 by DMA. Subsequently, shared file system client I/O issue processing unit 202 transmits a notification of raw I/O end to shared file system server mechanism 1011 at step 511, and receives a notification of I/O end from shared file system server mechanism 1011 at step 512. Then, at step 513, user program 201 seeks the same size as that issued in the write operation to match the file position, followed by termination of the write operation.

Figure 6:
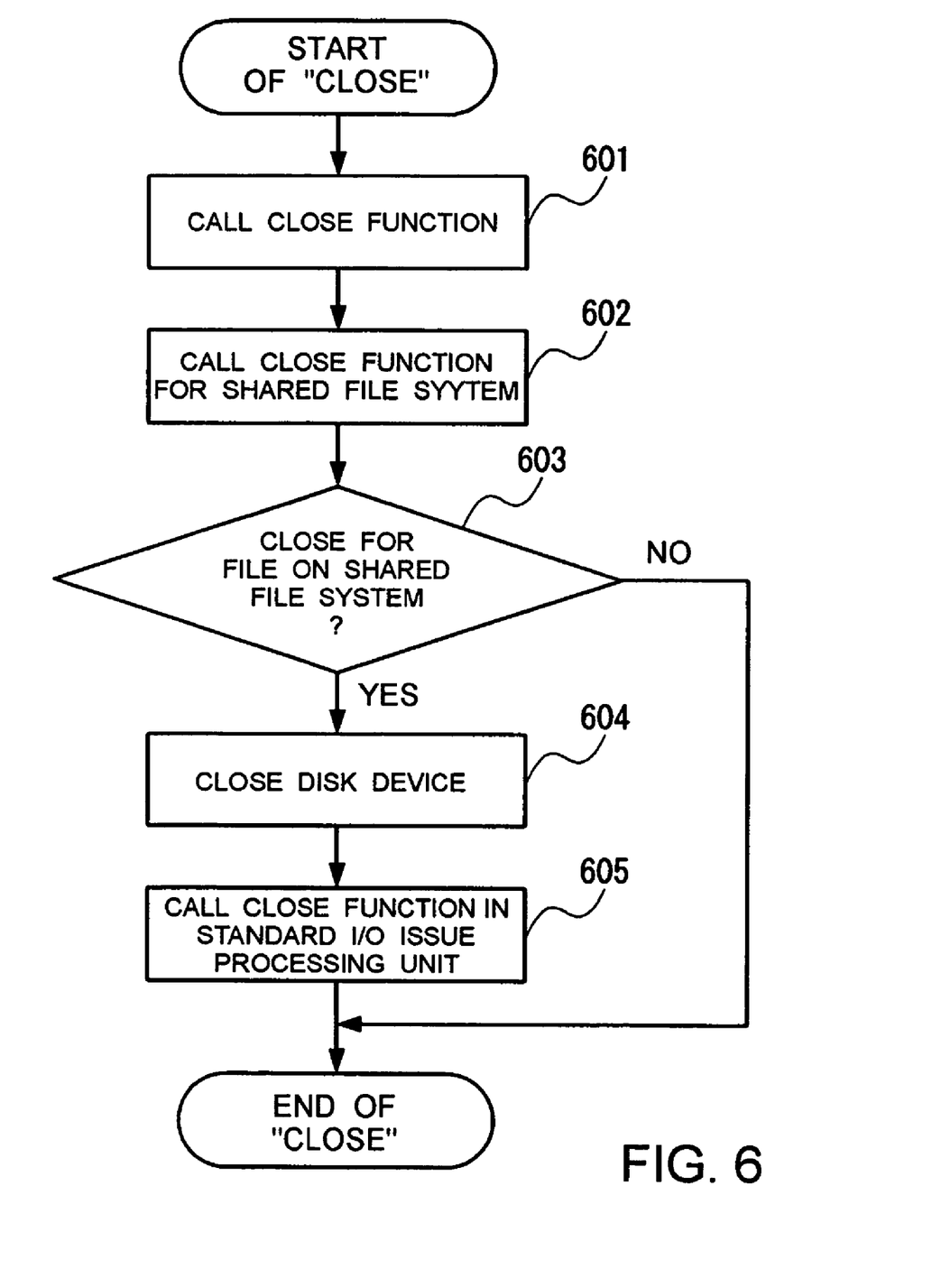
FIG. 6 is a flow chart for describing a sequence of operations performed when a user program closes a file on the shared disk device in the access system illustrated in FIG. 1.

Referring next to FIG. 6, description will be made on a sequence of operations performed when user program 201 closes file 80, i.e., executes a close function.

For closing file 80, user program 201 first calls the close function at step 601. The close function called in this event is a close function included in shared file system client I/O issue processing unit 202 in accordance with the order of a dynamic link search pass.

Next, at step 603, it is checked whether or not file 80 is resident on shared file system 60. If file 80 is not resident on shared file system 60, the file closing processing is terminated without further processing. On the other hand, if file 80 is resident on shared file system 60, user program 201 closes shared disk device 30 which has been previously opened. Then, at step 605, user program 201 calls a close function of standard I/O issue processing unit 205 to close file 80, thus completing the file closing processing.

Since the system for accessing a shared disk device on a SAN according to the foregoing embodiment is configured and operates as described above, the system is particularly advantageous in that: (1) a data access section is installed as part of a user program using a dynamic link library; (2) Raw I/O processing, which must be accessed in the privileged mode, is avoided by providing a proxy open daemon; and (3) a daemon for acquiring a file handle to a network file system is located in a server apparatus, so that the processing for making a fast access to a shared file system in SAN 40 can be executed separately from the processing of the kernel without altering user program 201. Consequently, the access system of the present invention can install a client functionality for accessing a shared disk device on the SAN without altering the kernel, and reduce the number of steps required to port the client functionality to a different platform.

Figure 7:
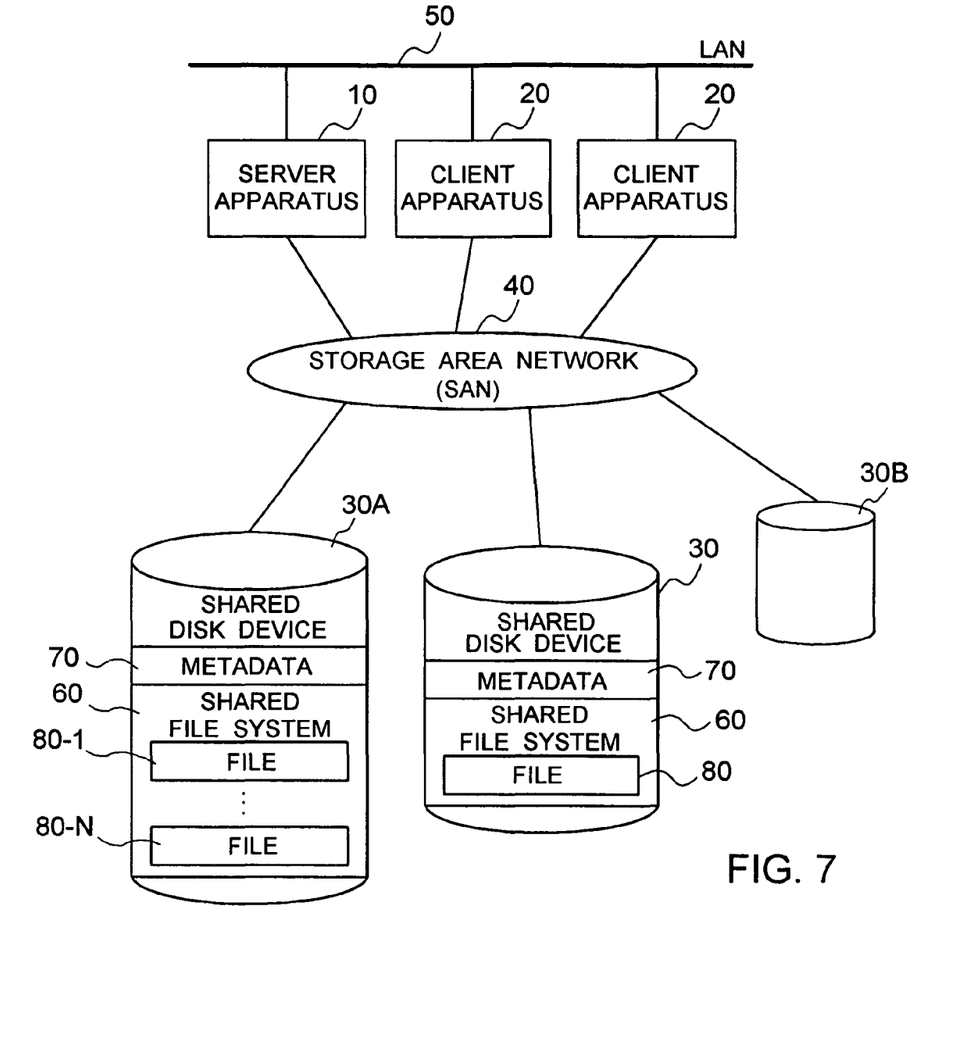
FIG. 7 is a block diagram illustrating the general configuration of an access system according to another embodiment of the present invention.

While the present invention has been described in connection with a preferred embodiment thereof, the present invention is not necessarily limited to the foregoing embodiment and implementations, but may be modified in various manners without departing from its technical idea to bring the invention into practical use. For example, LAN 50 may be located in SAN 40. Also, as illustrated in FIG. 7, a plurality of shared disk devices 30, 30A, 30B, . . . , may be connected to SAN 40, and a plurality of files 80-1, . . . , 80-N may be stored in shared disk device 30A. Further, as illustrated in FIG. 7, a plurality of client apparatuses 20 may be provided in the system.

While preferred embodiments of the present invention have been described using specific terms, such description is for illustrative purposes only, and it is to be understood that changes and variations may be made without departing from the spirit or scope of the following claims.

What is claimed is:

1. A system, comprising:

a shared disk device provided on a storage area network;

a server apparatus connected to the storage area network independently of the shared disk device; and a client apparatus directly connected to the storage area network independently of the server apparatus and the shared disk device for directly accessing a file in a file system created in said shared disk device;

wherein the client apparatus is configured such that, when the client apparatus executes an open function for opening the file, the client apparatus communicates with the server apparatus to acquire a file handle for the file from the server apparatus; and wherein the client apparatus is configured such that, when the client apparatus executes a read function for reading data from the file, the client apparatus (i) transmits a request including the file handle to the server apparatus and (ii) receives information including at least one of a physical address of the file, an I/O size of the file, and an offset value of the file from the server apparatus in response to the request and (iii) directly accesses the file using the received information to read the data from the file, wherein the open function and the read function are installed within the client apparatus as part of a user program of the client apparatus by utilizing a dynamic link library, the dynamic link library defining the open function and the read function in the same names as used in an application interface which is called by the user program, wherein said server apparatus comprises acquiring means for acquiring the file handle for the file, wherein said client apparatus comprises means for executing a proxy process which is a process executed in a privileged mode on the client apparatus to open, on behalf of the user program, a driver for accessing said shared disk device, wherein said dynamic link library includes a function for setting a search path of said dynamic link library implemented as a portion of the user program such that the access processing of the client apparatus is dynamically linked previously to the dynamic link library performing ordinary file access processing.

2. The system according to claim 1, wherein the client apparatus is configured such that, when the client apparatus executes the open function for opening the file, the client apparatus communicates with the server apparatus by utilizing a socket mechanism provided by a kernel to acquire the file handle for the file from the server apparatus.

3. The system according to claim 1, wherein said client apparatus is configured to execute a driver for accessing said shared disk device in a non-privileged mode by utilizing a socket mechanism included in a kernel.

4. A client apparatus for directly accessing a file in a file system created in a shared disk device on a storage area network, the client apparatus directly connected to the storage area network independently of a server apparatus and the shared disk device and able to communicate with the server apparatus that is connected to the storage area network independently of the shared disk device, said client apparatus comprising:

means for executing a user program for accessing said file, the user program including an open function and a read function;

wherein, when the means for executing executes the open function of the user program for opening the file, the client apparatus is caused to communicate with the server apparatus to acquire a file handle for the file from the server apparatus; and wherein, when the means for executing executes the read function of the user program for reading data from the file, the client apparatus is caused to (i) transmit a request including the file handle to the server apparatus and (ii) receive information including at least one of a physical address of the file, an I/O size of the file, and an offset value of the file from the server apparatus in response to the request and (iii) directly access the file using the received information to read the data from the file, wherein the open function and the read function are included in the user program by utilizing a dynamic link library, the dynamic link library defining the open function and the read function in the same names as used in an application interface which is called by the user program, wherein said server apparatus comprises acquiring means for acquiring the file handle for the file; and means for executing a proxy process which is a process executed in a privileged mode on the client apparatus to open, on behalf of the user program, a driver for accessing said shared disk device, wherein said dynamic link library includes a function for setting a search path of said dynamic link library implemented as a portion of the user program such that the access processing of the client apparatus is dynamically linked previously to the dynamic link library performing ordinary file access processing.

5. The client apparatus according to claim 4, wherein the information includes the physical address of the file, the I/O size of the file, and the offset value of the file.

6. The client apparatus according to claim 4, wherein, when the means for executing executes the open function of the user program for opening the file, the client apparatus is caused to communicate with the server apparatus by using a socket mechanism included in a kernel to acquire the file handle for the file from the server apparatus.

7. The client apparatus according to claim 4, wherein said client apparatus is configured to execute a driver for accessing said shared disk device in a non-privileged mode by utilizing a socket mechanism in a kernel.

8. The system according to claim 1, wherein the client apparatus is configured such that, when the client apparatus executes a write function for writing particular data to the file, the client apparatus (i) transmits a particular request including the file handle to the server apparatus and (ii) receives particular information including at least one of a particular physical address of the file, a particular I/O size of the file, and a particular offset value of the file from the server apparatus in response to the particular request and (iii) accesses the file using the received particular information to write the particular data to the file.

9. The system according to claim 1,
wherein the client apparatus is configured to execute the open function in a privileged mode; and
wherein the client apparatus is configured to execute the read function in a non-privileged mode.

10. The client apparatus according to claim 4,
wherein the user program further includes a write function; and
wherein, when the means for executing executes the write function of the user program for writing particular data to the file, the client apparatus is caused to (i) transmit a particular request including the file handle to the server apparatus and (ii) receive particular information including at least one of a particular physical address of the file, a particular I/O size of the file, and a particular offset value of the file from the server apparatus in response to the particular request and (iii) access the file using the received particular information to write the particular data to the file.

11. The client apparatus according to claim 4,
wherein the means for executing is configured to execute the open function in a privileged mode; and
wherein the means for executing is configured to execute the read function in a non-privileged mode.

12. A method in a system, the system including a shared disk device provided on a storage area network, a server apparatus connected to the storage area network independently of the shared disk device, and a client apparatus directly connected to the storage area network independently of the server apparatus and the shared disk device, the method comprising:
acquiring, by the client apparatus from the server apparatus when the client apparatus executes an open function for opening a file stored in the shared disk device, a file handle;
transmitting, from the client apparatus to the server apparatus when the client apparatus executes a read function for reading data from the file, a request including the file handle;
receiving, by the client apparatus from the server apparatus in response to the request, information including at least one of a physical address of the file, an I/O size of the file, and an offset value of the file; and
directly accessing, by the client apparatus using the received information, the file in the shared disk device to read the data from the file,
wherein the open function and the read function are installed within the client apparatus as part of a user program of the client apparatus by utilizing a dynamic link library;
acquiring the file handle for the file via said server apparatus;
executing a proxy process which is a process executed in a privileged mode on the client apparatus to open, on behalf of the user program, a driver for accessing said shared disk device; and
setting a search path of said dynamic link library implemented as a portion of the user program such that the access processing of the client apparatus is dynamically linked previously to the dynamic link library performing ordinary file access processing.

13. The method of claim 12, further comprising:
transmitting, from the client apparatus to the server apparatus when the client apparatus executes a write function for writing particular data to the file, a particular request including the file handle;
receiving, by the client apparatus from the server apparatus in response to the particular request, particular information including at least one of a particular physical address of the file, a particular I/O size of the file, and a particular offset value of the file; and
accessing, by the client apparatus using the received particular information, the file in the shared disk device to write the particular data to the file.

14. An access system comprising;
a shared disk device provided on a storage area network;
a server connected to said storage area network independently of the shared disk device; and
a client for directly accessing a file in a file system created in said shared disk device, said client being directly connected to said shared disk device and independent of said shared disk device and said server, wherein a functionality of accessing the file system in said shared disk device is installed within said client as part of a user program of said client by utilizing a dynamic link library of said client,
wherein said client comprises:
access processing means for inserting, as said functionality, access processing for accessing the file system in said shared disk device into ordinary file access processing, said access processing means being installed as a first dynamic link library;
a second dynamic link library for performing ordinary file access processing, wherein "open", "read', "write" and "close" functions are defined in the same symbol names in the first and second dynamic link libraries; and
means for executing a proxy process which is a process executed in a privileged mode on a client apparatus to open, on behalf of the user program, a driver for accessing said shared disk device,
wherein said user program sets a dynamic link library search path such that the access processing means is dynamically linked previously to the second dynamic link library for performing ordinary file access processing,
wherein, in a process for opening the file system in said shared disk device, said user program requests the proxy process for a copy of a file handle for a file in said file system and obtains the copy of the file handle, wherein said user program uses the copy of the file handle to access said device when accessing said file, and
wherein said server comprises acquiring means for acquiring a file handle for a file in said file system to be accessed by said client, and transmits said file handle to said client.

15. The system according to claim 14, wherein said access processing means acquires the file handle from said acquiring means by utilizing a socket mechanism provided by a kernel.

16. The system according to claim 14, wherein said access processing means executes a driver for accessing said shared disk device in a non-privileged mode by utilizing a socket mechanism included in a kernel.

17. A client for directly accessing a file in a file system created in a shared disk device on a storage area network, said client being independent of said shared disk device and a server on said storage area network, said server being independent of said shared disk device, and comprising:

means for executing a user program for directly accessing said file;

means for installing a functionality of accessing said file system as part of said user program by utilizing a dynamic link library of said client, the dynamic link library defining a function corresponding to the functionality in the same name as used in an application interface which is called by the user program;

means for executing a proxy process which is a process executed in a privileged mode on a client apparatus to open, on behalf of the user program, a driver for accessing said shared disk device;

access processing means for inserting, as said functionality, access processing for accessing the file system in said shared disk device into ordinary file access processing, said access processing means being installed as a first dynamic link library;

and a second dynamic link library for performing ordinary file access processing, wherein "open", "read", "write" and "close" functions are defined in the same symbol names in the first and second dynamic link libraries,     wherein said user program sets a dynamic link library search path such that the access processing means is dynamically linked previously to the second dynamic link library for performing ordinary file access processing, said client being directly connected to said shared disk device,     wherein, in a process for opening the file system in said shared disk device, said user program requests the proxy process for a copy of a file handle for a file in said file system and obtains the copy of the file handle, wherein said user program uses the copy of the file handle to access said device when accessing said file,     wherein said client acquires a file handle to a file in said file system to be accessed from a file handle acquisition process of said server on said storage area network.

18. The client according to claim 17, wherein said access processing means acquires the file handle from said file handle acquisition process of said server by utilizing a socket mechanism included in a kernel.

19. The client according to claim 17, wherein said access processing means executes a driver for accessing said shared disk device in a non-privileged mode by utilizing a socket mechanism in a kernel.

20. The system according to claim 1, wherein the client apparatus is connected to the server apparatus by a secondary network.

21. The system according to claim 1, wherein the client apparatus, (iii) accesses the file of the shared disk device using the received information to read the data from the file.

22. The system according to claim 8, wherein the client apparatus, (iii) accesses the file of the shared disk device using the received particular information to write the particular data to the file.

23. The client apparatus according to claim 4, wherein the client apparatus is caused to, (iii) access the file of the shared disk device using the received information to read the data from the file.

24. The client apparatus according to claim 10, wherein the client apparatus is caused to, (iii) access the file of the shared disk device using the received particular information to write the particular data to the file.

* * * * *